Oct. 27, 1959  R. W. COOK  2,910,083
METHOD AND APPARATUS FOR TERMINATING AND
EXTENDING FLUID TRANSMISSION MAINS
Filed Jan. 10, 1958
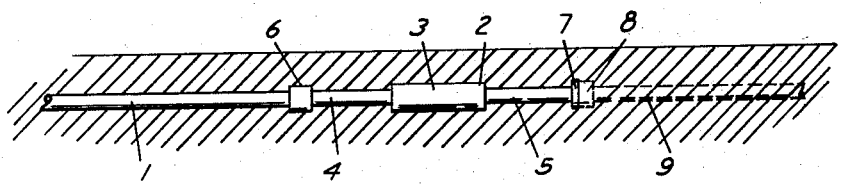
Fig. 1.
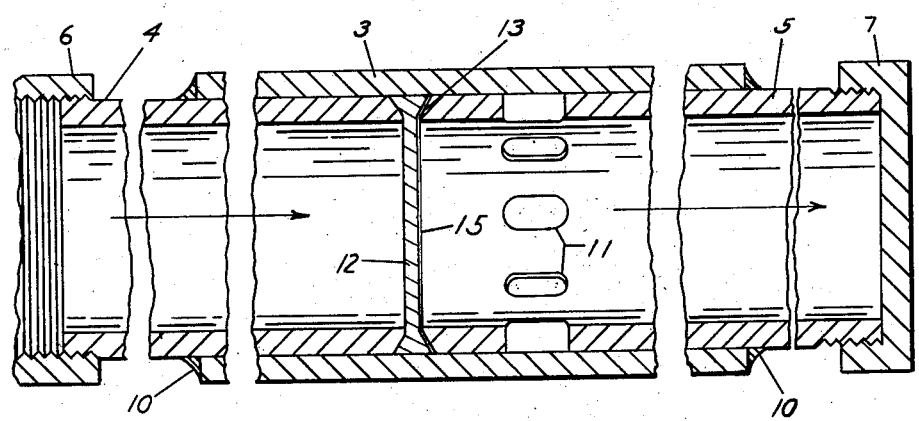
Fig. 2.
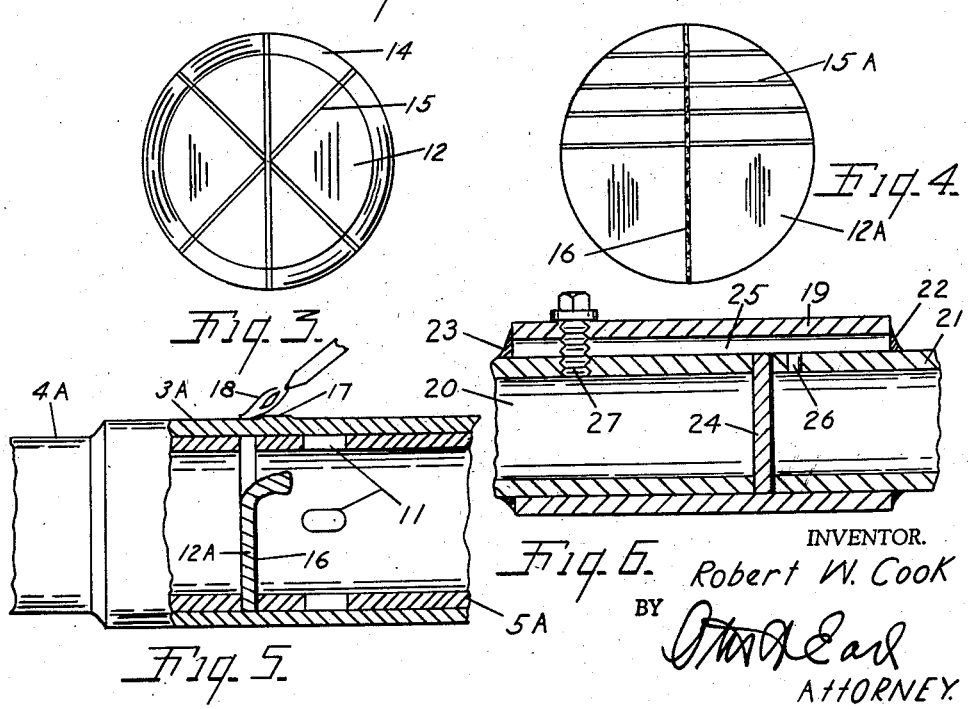
Fig. 3.
Fig. 4.
Fig. 5.
Fig. 6.
INVENTOR.
Robert W. Cook
BY
ATTORNEY.

2,910,083

METHOD AND APPARATUS FOR TERMINATING AND EXTENDING FLUID TRANSMISSION MAINS

Robert W. Cook, Decatur, Ind., assignor to
C. W. Fuelling, Inc., Decatur, Ind.

Application January 10, 1958, Serial No. 708,102

4 Claims. (Cl. 137—74)

This invention relates to method and apparatus for terminating and extending fluid transmission mains. The principal objects of this invention are:

First, to provide a method of terminating fluid mains such as gas mains and later connecting extensions thereto which can be accomplished by unskilled workmen at minimum expense without discontinuing service in the original main.

Second, to provide a method of terminating a fluid main and later adding an extension thereto which requires only the installation of a heat meltable closure in the original terminus and the later connection of an extension to the end of the original main and the collapse of the closure by the application of heat externally to the main adjacent to the closure.

Third, to provide a fluid main termination which is adapted on its free end for connection to a main extension and which includes a closure that can be released by the application of heat after the extension has been connected to fully open the original main to the extension.

Fourth, to provide a fluid main terminating fitting that is inexpensive, durable and capable of forming a connection to a main extension without discontinuing service in the original main.

Other objects and advantages will be apparent from a consideration of the following description and claims. The drawings, of which there is one sheet, illustrate two highly practical forms of the main terminating structure and two modified forms of closure disc therefore and further illustrate the steps involved in practicing the method of the invention.

Fig. 1 is a fragmentary vertical cross sectional view showing the end of a gas main terminated by the apparatus of the invention and adapted to be extended by the process of the invention.

Fig. 2 is an enlarged longitudinal cross sectional view through the main terminating apparatus.

Fig. 3 is an elevational view of the closure disc disclosed in Fig. 2.

Fig. 4 is an elevational view of a modified closure disc which may be used as a substitute for the disc shown in Fig. 3.

Fig. 5 is a fragmentary longitudinal cross sectional view through a modified form of the terminating structure and illustrating the method of removing the closure disc from operative position in the main.

Fig. 6 is a fragmentary longitudinal cross sectional view through a further modified form of terminating structure.

In the transportation and distribution of fluids such as natural gas, it is often found necessary to extend the pipe or main after the main has initially been installed and closed at the end. While the method and apparatus of the invention are applicable to any type of fluid main such as water mains or gasoline pipes they are particularly desirable for use in connection with distribution mains for gas fuel in residential communities. It is common to utilize gas mains operating under relatively high pressure such as 100 pounds per square inch or more and when a section of main is installed and connected to various residences it becomes difficult to later extend the main to accommodate additional buildings because the connection between the old main and the extension cannot be made without the use of relatively expensive equipment and skilled labor or by shutting off the pressure in the old main which necessitates expensive safety measures to assure the relighting of all pilot lights of all the residences served by the old main. The present invention provides structure and method which permits relatively inexperienced workmen to connect the old main to a new extension without discontinuing service from the old main.

Fig. 1 illustrates an old or existing main 1 buried under ground and terminated or closed at its end by means of the terminating apparatus 2 of the invention. The terminating apparatus includes an outer sleeve 3 with an inlet pipe 4 and outlet pipe 5 projecting from opposite ends thereof. The inlet pipe 4 is connected to the end of the main 1 by a conventional coupling 6 such as a threaded coupling or a welded joint. The end of the outlet pipe 5 is provided with a protective cover or cap 7 which is removed for the attachment of an additional coupling 8 connecting the outlet pipe to an extension main 9 whenever the need for extending the original main arises.

The terminating structure 2 appears more clearly in Fig. 2 wherein the inlet pipe 4 and outlet pipe 5 are disclosed as projecting into the sleeve 3 with their inner ends in spaced relation. The pipes are permanently sealed and connected in the sleeve by welds 10 and in the example illustrated in Fig. 2 the outlet pipe 5 is provided with an annular series of angularly spaced holes 11 forming recesses within the pipe adjacent to the inner end thereof. Positioned and clamped between the opposed inner ends of the pipes 4 and 5 is a closure or partition 12. In this form of the invention the opposed ends of the pipes are outwardly beveled as at 13 and the periphery of the closure disc 12 is increasingly thickened as at 14 to grippingly retain the periphery of the disc between the opposed pipes.

The closure disc 12 is made of material having a relatively low melting point such as polyethylene plastic or lead and thin solder. When acrylonitrilestyrene is used, a thickness of .020 inch is sufficient to withstand and retain 200 pounds pressure in a two inch main. Secured in heat transfer relation with the disc 12 as by being secured or embedded in the face of the disc are a plurality of transverse wires 15 or strips of relatively high heat conducting material such as copper or aluminum. It is pointed out that the sleeve 3 is sufficiently long so that the heat applied in forming the welds 10 will not effect the partition 12.

When it is desired to add the extension main 9 the protective cap 7 is removed and the connecting coupling 8 between the outlet pipe 5 and the main extension is installed. When the extension main is ready for charging, heat is applied locally around the sleeve 3 directly around the partition 12. This heat is transmitted through the sleeve 3 to the periphery of the partition and is further distributed by the heat conducting strands 15 over the interior portion of the partition.

The partition or disc being of relatively low melting point material soon collapses and pulls out of the slot between the inlet and outlet pipe under the influence of the fluid pressure in the main and the softening character of the partition material itself. This admits gas under pressure to the extension main through the outlet pipe 5. Further heating of the sleeve completely therearound can cause all of the material in the partition to melt and flow into the lower most pocket 11 where it will solidify without offering any obstruction to the full flow of gas through the pipes 4 and 5.

The modified form of partition 12A shown in Fig. 4 is perfectly flat without a thickened rim and is adapted to fit between the straight ends of the modified inlet pipe 4A and outlet pipe 5A in Fig. 5. The partition 12A has a plurality of transversely extending heat conducting strands 15A which facilitate the early melting or softening of the upper portion of the partition. In order to prevent the pressure in the inlet pipe 4 from blowing the partially released partition into the extension main where it could act as an obstruction the partition 12A is provided with a vertical strand 16 of non-fuseable material such as fiber glass strand. In order to facilitate the insulation of the partition 12A with the fiber glass strand upright the modified sleeve 3A in Fig. 5 is provided with an exterior indicia mark 17 on its surface.

With this form of the invention heat is applied first to the top of the sleeve 3 as indicated by the flame 18 thus softening the upper portion of the partition and permitting it to melt or bend outwardly from the inlet pipe 4A under the influence of the pressure in the main. The fiber glass strand 16 prevents the collapsing partition from escaping into the new main extension and as heat is applied to the sleeve progressively further down its sides the material in the partition melts and runs into the lower most recess formed by the holes 11. The melted down material from the partition is thus substantially removed from the interior of the outlet pipe 5A and does not form any obstruction to the full flow of gas through the main.

The modified form of the termination has the added advantage of permitting the pressure in the new section of the main to be increased gradually to purge the air from the new main and to equalize pressure on opposite sides of the disc or partition before the disc is melted so that the disc is not blown into the new main. This termination included a sleeve 19 that is slightly larger than the inlet pipe 20 and the outlet pipe 21. The sleeve is welded as at 22 in eccentric relation to the outlet pipe and as at 23 to the inlet pipe in the same eccentric relation. The weld 22 is made first so that the flat disc 24 will not be subjected to the welding heat but will be close to the weld 22 for good heat transfer when the pipe is later heated to shrink the disc. The inlet pipe 20 is compressed against the disc and the weld 23 completed after the weld 22 has cooled.

The eccentricity of the sleeve 19 leaves a passage 25 across the periphery of the disc 24 and the outlet pipe 21 has a small port 26 opening to the passage.

The sleeve 19 and inlet pipe 20 are drilled and tapped to receive the screw plug 27 that normally seals the passage 25 from the inlet pipe.

When the new extension main is completed and attached to the outlet pipe 21 the plug 27 is backed out to bleed high pressure gas into the passage 25 and port 26 to force air out of the new main and equalize pressure on opposite sides of the disc 24. The plug 27 is then resealed and heat is applied in the area of the weld 22 to shrink or melt the disc 24 which falls to the bottom of the pipe and opens up substantially the full cross section of the main.

Having thus described the invention, what is claimed as new and is desired to be secured by Letters Patent is:

1. A fitting for terminating the end of a pipeline comprising a pair of pipes one of which is adapted to be connected to the end of said pipeline, a sleeve having a larger interior diameter than the exterior diameter of said pipes and secured over the ends of said pipes with its ends sealed thereto and with one end closer to the end of the other of said pipes than the other end of the sleeve is to the end of said one of said pipes and with the sleeve forming a passage bridging the ends of the pipes, a partition clamped between the adjacent ends of said pipes and made of material that is deformable by relatively less heat than the material of said pipes, said one of said pipes and said sleeve defining alined threaded openings opening to the passage in said sleeve, the other of said pipes defining a port opening to said passage, and a threaded plug engaged in said alined openings and removably closing the opening in said one pipe.

2. A fitting for terminating the end of a pipeline comprising a pair of pipes one of which is adapted to be connected to the end of said pipeline, a sleeve secured over the ends of said pipes with its ends sealed thereto and with one end closer to the end of the other of said pipes than the other end of the sleeve is to the end of said one of said pipes and with the sleeve forming a passage bridging the ends of the pipes, a partition clamped between the adjacent ends of said pipes and made of material that is deformable by relatively less heat than the material of said pipes, one of said pipes and said sleeve defining alined threaded openings opening to the passage in said sleeve, the other of said pipes defining a port opening to said passage, and a threaded plug engaged in said alined openings and removably closing the opening in said one pipe.

3. A fitting for terminating the end of a pipeline comprising a pair of pipes one of which is adapted to be connected to the end of said pipeline, a sleeve having a larger interior diameter than the exterior diameter of said pipes and secured over adjacent ends of said pipes with its ends sealed to the pipes in spaced relation to said adjacent ends with the sleeve forming a passage bridging the ends of the pipes, a partition clamped between the adjacent ends of said pipes and made of material that is deformable by relatively less heat than the material of said pipes, one of said pipes and said sleeve defining alined threaded openings opening to the passage in said sleeve, the other of said pipes defining a port opening to said passage, and a threaded plug engaged in said alined openings and removably closing the opening in said one pipe.

4. A fitting for terminating the end of a pipeline comprising a pair of pipes which are adapted to be connected to the end of a pipeline, a sleeve secured over adjacent ends of said pipes with its ends sealed to the pipes in spaced relation to said adjacent ends with the sleeve forming a passage bridging the adjajcent ends of the pipes, a partition clamped between the adjacent ends of said pipes and made of material that is deformable by relatively less heat than the material of said pipes, one of said pipes and said sleeve defining alined openings opening to the passage in said sleeve, the other of said pipes defining a port opening to said passage, and a plug engaged in said alined openings and removably closing the opening in said one pipe.

References Cited in the file of this patent

UNITED STATES PATENTS

| | | |
|---|---|---|
| 1,921,809 | Crain | Aug. 8, 1933 |
| 2,367,639 | Conboy | Jan. 16, 1945 |
| 2,766,408 | Georgiev et al. | Oct. 9, 1956 |
| 2,782,496 | Augustauskas | Feb. 26, 1957 |